US012516687B2

(12) United States Patent

Larish et al.

(10) Patent No.: US 12,516,687 B2

(45) Date of Patent: Jan. 6, 2026

(54) ACTUATOR DEADHEAD/STALL DETECTION IN A LOAD SENSE HYDRAULIC SYSTEM

(71) Applicant: Danfoss A/S, Nordborg (DK)

(72) Inventors: Chad Anthony Larish, Rochester, MN (US); Roger D. Lowman, Simpsonville, SC (US); Aaron Hertzel Jagoda, Bloomington, MN (US)

(73) Assignee: DANFOSS A/S, Nordborg (DK)

( * ) Notice: Subject to any disclaimer, the term of this patent is extended or adjusted under 35 U.S.C. 154(b) by 95 days.

(21) Appl. No.: 18/566,428

(22) PCT Filed: Jun. 3, 2022

(86) PCT No.: PCT/IB2022/055206

§ 371 (c)(1),
(2) Date: Dec. 1, 2023

(87) PCT Pub. No.: WO2022/254403

PCT Pub. Date: Dec. 8, 2022

(65) Prior Publication Data

US 2024/0360850 A1 Oct. 31, 2024

Related U.S. Application Data

(60) Provisional application No. 63/197,008, filed on Jun. 4, 2021.

(51) Int. Cl.
*F15B 19/00* (2006.01)
*E02F 9/22* (2006.01)
(Continued)

(52) U.S. Cl.
CPC .......... *F15B 19/005* (2013.01); *E02F 9/2214* (2013.01); *E02F 9/2235* (2013.01);
(Continued)

(58) Field of Classification Search
CPC .................. F15B 11/165; F15B 19/005; F15B 2211/20553; F15B 2211/6054;
(Continued)

(56) References Cited

U.S. PATENT DOCUMENTS 6,321,152 B1 11/2001 Amborski et al.
8,281,583 B2 * 10/2012 Kauss .................. F15B 11/166 60/452
(Continued)

FOREIGN PATENT DOCUMENTS

DE 10 2013 014 283 A1 3/2015

OTHER PUBLICATIONS

International Search Report mailed on Aug. 8, 2022, in connection with the corresponding International Application No. PCT/IB2022/055206; 4 pages.

*Primary Examiner* — Michael Leslie
(74) *Attorney, Agent, or Firm* — McCormick, Paulding & Huber PLLC

(57) ABSTRACT

A load sense hydraulic system includes pressure sensors that provide feedback to an electronic controller to monitor a pressure margin between a pump supply pressure and an actuator meter-in load pressure. Pre-collapse and collapse of the pressure margin (the collapse indicating a deadhead or stall condition of the actuator), can be tracked by the electronic controller to establish a normal operating pressure margin. The established normal operating pressure margin can be assessed by the controller against a current, actual pressure margin based on feedback from the pressure sensors. A pre-determined threshold variation by the actual pressure margin from the normal operating pressure margin provides an indication of deadhead or stall condition to the
(Continued)

controller. The controller may then responsively make modifications to the load sense hydraulic system to remedy the deadhead/stall condition.

15 Claims, 8 Drawing Sheets

(51) Int. Cl.
*F15B 11/16* (2006.01)
*F15B 21/08* (2006.01)

(52) U.S. Cl.
CPC .......... *F15B 11/165* (2013.01); *F15B 21/087* (2013.01); *F15B 2211/20553* (2013.01); *F15B 2211/30555* (2013.01); *F15B 2211/30575* (2013.01); *F15B 2211/6054* (2013.01); *F15B 2211/6309* (2013.01); *F15B 2211/6313* (2013.01); *F15B 2211/853* (2013.01); *F15B 2211/857* (2013.01); *F15B 2211/86* (2013.01)

(58) Field of Classification Search
CPC ........ F15B 2211/6313; F15B 2211/853; F15B 2211/835; E02F 9/2225; E02F 9/2228; E02F 9/2232; E02F 9/2235; E02F 9/2214
See application file for complete search history.

(56) References Cited

U.S. PATENT DOCUMENTS

| | | | | |
|---|---|---|---|---|
| 9,128,008 | B2 | 9/2015 | Tabor | |
| 9,334,883 | B2 | 5/2016 | Vigholm et al. | |
| 9,932,996 | B2 | 4/2018 | Gratton et al. | |
| 11,268,545 | B2 * | 3/2022 | Szeles | E02F 9/2235 |
| 11,421,395 | B1 * | 8/2022 | Schurman | F15B 11/16 |
| 11,466,429 | B2 * | 10/2022 | Ness | E02F 3/965 |
| 11,597,369 | B2 * | 3/2023 | Hodel | G06N 20/00 |
| 2005/0146252 | A1 | 7/2005 | Chuang | |
| 2012/0216518 | A1 | 8/2012 | Peterson et al. | |
| 2014/0069091 | A1 * | 3/2014 | Franzoni | F15B 13/022 60/429 |

* cited by examiner

ACTUATOR DEADHEAD/STALL DETECTION IN A LOAD SENSE HYDRAULIC SYSTEM

CROSS-REFERENCE TO RELATED APPLICATIONS

This application is a National Stage application of International Patent Application No. PCT/IB2022/055206, filed on Jun. 3, 2022, which claims priority to U.S. Provisional Patent Application No. 63/197,008, filed Jun. 4, 2021, each of which is hereby incorporated by reference in its entirety.

TECHNICAL FIELD

The present disclosure is directed to hydraulic systems and, more particularly, to deadhead or stall detection of an actuator within a load sense hydraulic system.

BACKGROUND

A deadhead situation occurs within a load sense hydraulic system when an actuator reaches its end stop and pressure within the system is stopped or blocked. A stall situation occurs within a hydraulic system occurs when an actuator encounters a load requiring a pressure that is greater than the hydraulic system can provide. An ability to detect a deadhead or stall situation within a load sense hydraulic system is needed.

SUMMARY

A load sense hydraulic system includes pressure sensors that provide feedback to an electronic controller to monitor a pressure margin between a pump supply pressure and an actuator meter-in load pressure. Pre-collapse and collapse of the pressure margin (the collapse indicating a deadhead or stall condition of the actuator), can be tracked by the electronic controller to establish a normal operating pressure margin. The established normal operating pressure margin can be assessed by the controller against a current, actual pressure margin based on feedback from the pressure sensors. A pre-determined threshold variation by the actual pressure margin from the normal operating pressure margin provides an indication of deadhead or stall condition to the controller. The controller may then responsively make modifications to the load sense hydraulic system to remedy the deadhead/stall condition.

In certain aspects, the present disclosure is directed to a hydraulic system including a hydraulic actuator, at least one metering valve, a variable displacement hydraulic pump, at least one pressure sensor, a post compensation load sense system, and an electronic controller. The hydraulic actuator has first and second ports and, during operation, one of the first and second ports has a meter-in load pressure and the other of the first and second ports has a meter-out pressure. The metering valve is for metering flow in and out of the hydraulic actuator. The load sense system includes a load sense valve that provides a load pressure of the hydraulic actuator to the variable displacement hydraulic pump, the variable displacement hydraulic pump operating to maintain a normal operating pressure margin above the actuator load pressure enabling flow to the hydraulic actuator responsive to a command for flow to the hydraulic actuator. The electronic controller monitors hydraulic pressure in the hydraulic system via the pressure sensor. The electronic controller generates a deadhead or stall indication with respect to the hydraulic actuator when flow is being commanded to the hydraulic actuator and at least one of the following conditions is detected: (a) the meter-out pressure decreases below a predetermined meter-out pressure threshold; or (b) an actual pressure margin above the meter-in load pressure decreases by a predetermined amount as compared to the normal operating pressure margin.

In certain aspects, the present disclosure is directed to a load sense hydraulic system. The system includes first and second actuators along with first and second flow lines respectively corresponding to the first and second actuators. The system further includes a first metering valve for metering flow to the first actuator through the first flow line and a first pressure compensating valve positioned along the first flow line between the first metering valve and the first actuator as well as a second metering valve for metering flow to the second actuator through the second flow line and a second pressure compensating valve positioned along the second flow line between the second metering valve and the second actuator. This function can also be accomplished by a single electronically controlled valve providing both the metering and pressure compensating function.

The system is also provided with a variable displacement hydraulic pump and a load sense system. The load sense system controls the displacement of the hydraulic pump based on a highest load pressure of first and second load pressures respectively present in the first and second flow lines adjacent the first and second actuators. The load sense system includes a load sense valve for controlling an output pressure of the pump based on the highest load pressure to maintain a normal operating pressure margin across the metering valve and the pressure compensating valve corresponding to the flow line having the highest load pressure. The load sense system provides pilot pressure to the first and second pressure compensating valves and to the load sense valve and includes a pressure relief valve.

The system further includes a pressure sensor and an electronic controller. The electronic controller monitors, via the pressure sensor, an actual pressure margin across the metering valve and the pressure compensating valve corresponding to the flow line having the highest load pressure. The electronic controller generates a deadhead or stall indication when the actual pressure margin decreases by a predetermined amount as compared to a pre-determined normal operating pressure margin.

In certain aspects, the present disclosure is directed to a method of operating a load sense hydraulic system where the method includes: (a) determining, based on orientation data being received from the first IMU, that the orientation threshold has been exceeded and that the first actuator is stalled; (b) responsive to determining that the first actuator is stalled, reducing a flow command to the stalled actuator and monitoring the actual pressure margin for an indication that the actuator is moving; (c) receiving the indication that the actuator is moving and, responsively, reducing a meter-in valve command to provide a valve area need to supply the reduced flow command at a load sense margin setting of the hydraulic pump; and (d) continuously monitoring the actual load sense margin for return to normal operation load sense margin and, responsive to a return to the normal load sense margin, gradually increase the flow command from the reduced value to an original flow command.

In certain aspects, the method of operating a load sense hydraulic system further includes: (a) determining, based on orientation data being received from the first IMU, that the orientation threshold has not been exceed and that the first actuator is near an end stop; and (b) responsive to the orientation threshold not being exceeded, setting a flow request for the first actuator to zero until flow opposite the first flow line is requested.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

DETAILED DESCRIPTION

A load sense hydraulic system includes pressure sensors that provide feedback to an electronic controller to monitor a pressure margin between a pump supply pressure and an actuator meter-in load pressure. Pre-collapse and collapse of the pressure margin (the collapse indicating a deadhead or stall condition of the actuator), can be tracked by the electronic controller to establish a normal operating pressure margin. The established normal operating pressure margin can be assessed by the controller against a current, actual pressure margin based on feedback from the pressure sensors. A pre-determined threshold variation by the actual pressure margin from the normal operating pressure margin provides an indication of deadhead or stall condition to the controller. The controller may then responsively make modifications to the load sense hydraulic system to remedy the deadhead/stall condition.

The load sense hydraulic system described herein includes only two actuators for simplicity. However, it should be appreciated by those skilled in the art that the load sense hydraulic system can be expanded to include greater than two actuators with each additional actuator being serviced by the pump in a similar configuration. In general, load sense hydraulic systems are so called because a load-induced pressure downstream of an orifice is sensed and pump flow is adjusted to maintain a constant pressure drop (and flow) across the orifice. Applications for a load sense hydraulic system include but are not limited to boom lifts, cherry pickers, scissor lifts, forklifts and winches. Further, it should be noted that deadhead/stall detection strategies described here can be used for post-compensated, pre-compensated, non-compensated and electrically compensated load sense valves.

Figure 1A:
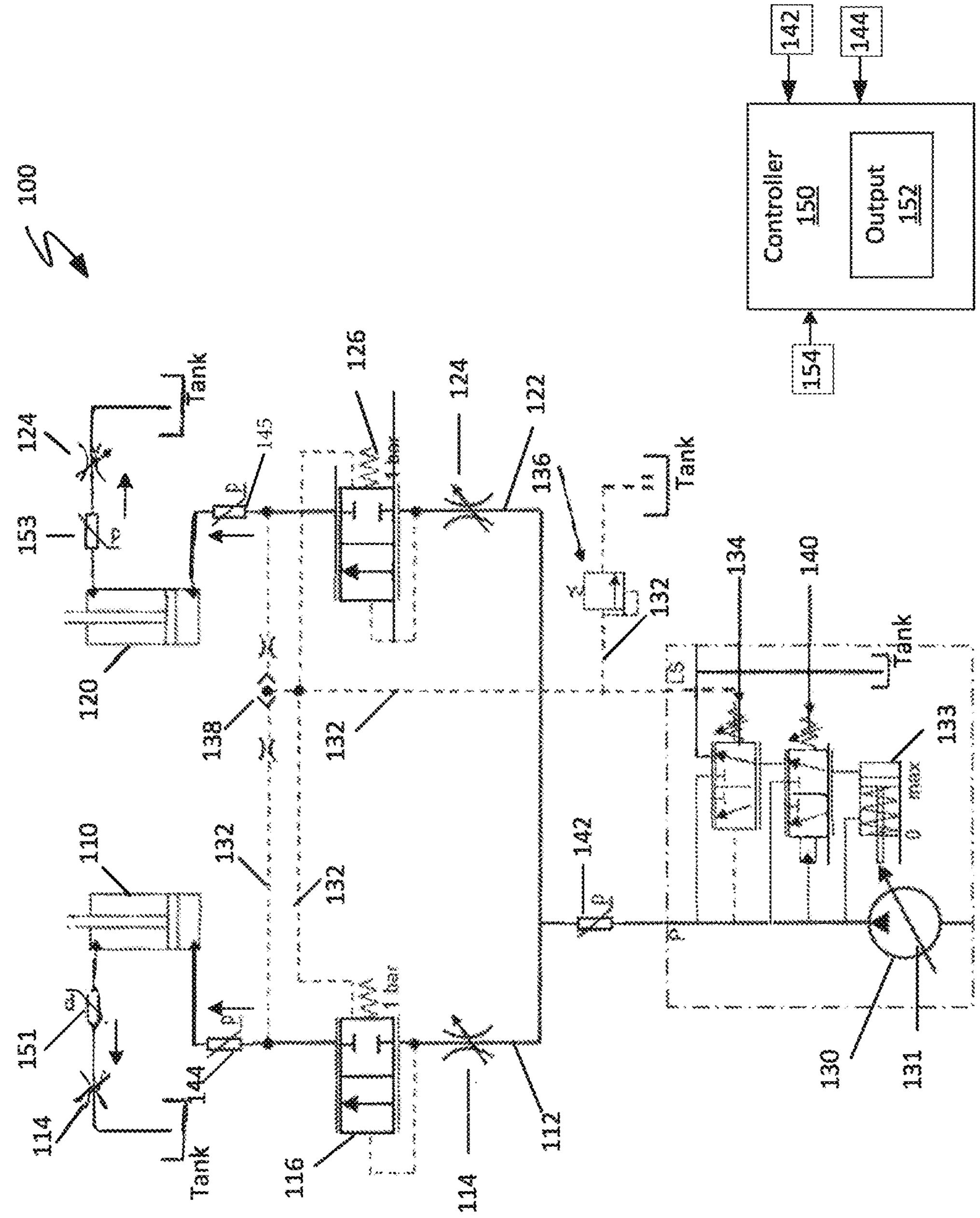
FIG. 1A is a schematic of an example load sense hydraulic system.
Figure 1B:
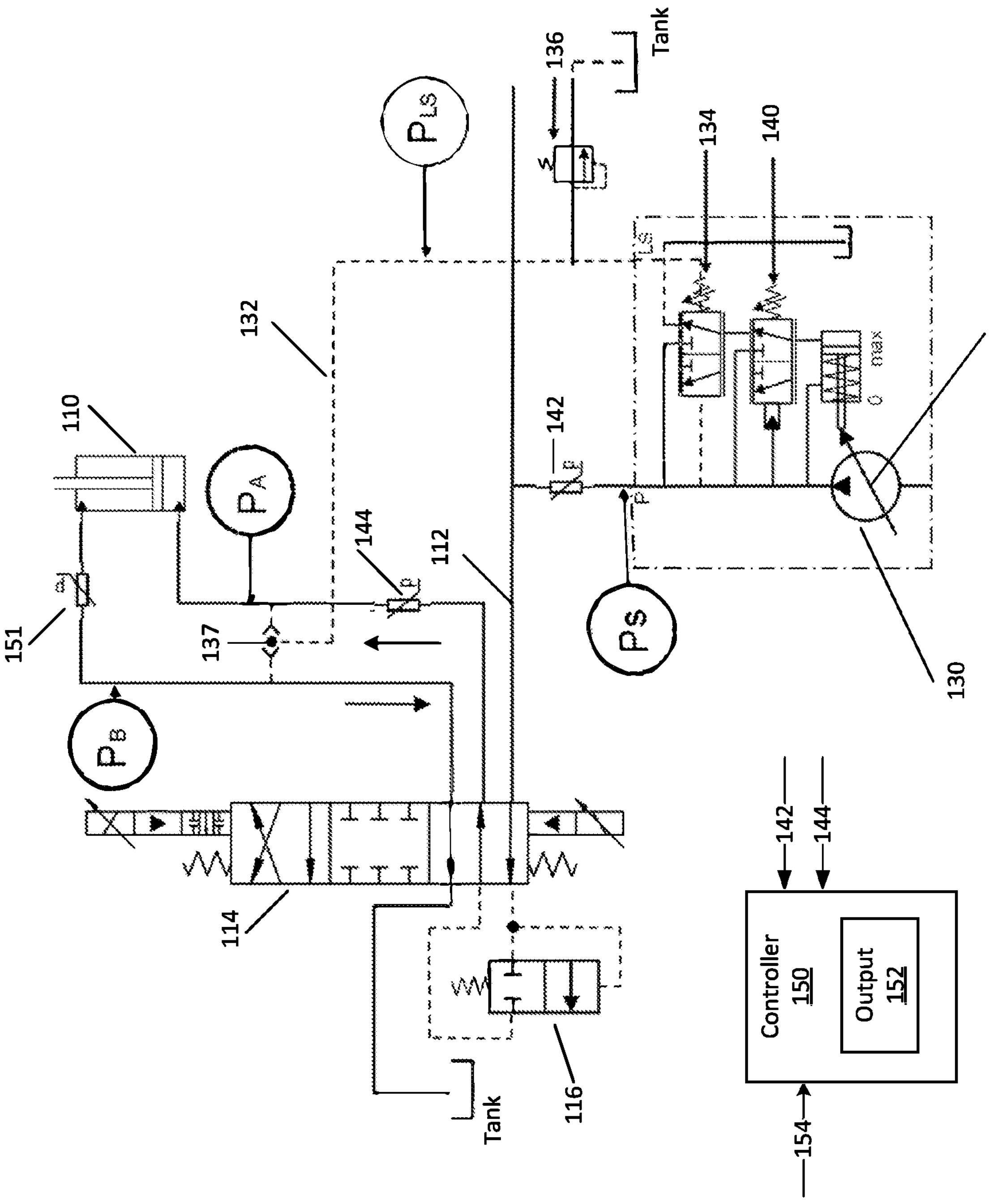
FIG. 1B is schematic providing a detailed view of a metering valve of the load sense hydraulic system of FIG. 1A.

Referring to FIGS. 1A-1B, the load sense hydraulic system 100 includes first and second hydraulic actuators 110, 120 with first and second flow lines 112, 122, respectively corresponding to the first and second hydraulic actuators 110, 120. A first metering valve 114 meters the flow to the first actuator 110 through the flow line 112 and a first pressure compensating valve 116 is positioned along the first flow line 112 intermediate the first actuator 110 and the first metering valve 114. Each of the first metering valve 114 and the first pressure compensating valve 116 establishes a known pressure drop across the respective valve 114, 116.

Similarly, a second metering valve 124 meters the flow to the second actuator 120 through the flow line 122 and a second pressure compensating valve 126 is positioned along the second flow line 122 intermediate the second actuator 120 and the second metering valve 124. Each of the second metering valve 124 and the second compensating valve 126 creates a known pressure drop across the respective valve.

The hydraulic system 100 further includes a variable displacement hydraulic pump 130, which supplies hydraulic fluid to all valves in the hydraulic system 100. Any hydraulic fluid drained from the valves or actuators 110, 120 is returned to a tank. The variable displacement hydraulic pump additionally works in conjunction with a post-compensation load sense system. The post-compensation load sense system includes a load sense line 132, indicated in FIGS. 1A and 1B by the dashed lines, as well as a load sense valve 134, a pressure relief valve 136, and a check valve 138, the compensation load sense system providing pilot pressure to the first and second pressure compensating valves 116, 126 as well as the load sense valve 134. A pressure compensator valve 140 limits maximum operating pressure of the load sense hydraulic system by reducing pump displacement to maintain the set pressure when the set pressure of the pressure compensator valve is reached.

In operation, the load sense valve 134, via the pressure compensator valve 140, adjusts the displacement of the variable displacement hydraulic pump 130 based on pump pressure. The load sense valve 134 works to maintain a constant pressure drop across whichever metering valve 114 or 124 is supplying the highest pressure load. In order to do this, the load sense valve 134 receives a load sense pressure. The load sense pressure is the highest load sense pressure relative to the first and second actuators 110, 120. The highest load sense pressure is provided to the load sense valve 134 via the check valve 138. The side of the check valve 138 that receives the highest pressure is adapted to close the other side of the check valve 138 so that only the highest load sense pressure is sensed by the load sense valve 134. A check valve 137 is also provided between the meter-in (port A) and meter-out (port B) flow lines enabling the higher pressure of the two to be provided to the load sense valve 134.

In certain embodiments, the variable displacement hydraulic pump 130 includes a swash plate 131 that is moved to adjust the volumetric displacement of the pump. In one example, the swash plate can be biased toward a maximum pump displacement position by a spring and can be moved from the maximum pump displacement position toward a minimum pump displacement position by a hydraulic pump control actuator 133. When the output pressure from the pump 130 is below a maximum pump pressure set by the pump pressure compensator 140 (e.g., by a spring load on a valve spool of the pump pressure compensator), the pump pressure compensator 140 maintains the pump control actuator in fluid communication with tank so that the swash plate remains in the maximum displacement position. When the output pressure from the pump reaches a maximum pump pressure set by the pump pressure compensator 140, the pump pressure compensator 140 places the pump control actuator 133 in fluid communication with pump output pressure so that the swash plate 131 moves toward the minimum pump displacement position thereby destroking the pump 130 and reducing pump displacement to prevent the pump output pressure from exceeding the maximum pump pressure set by the pump pressure compensator 140. When the output pressure from the pump 130 yields a pressure margin that is less than a pressure margin set by the load sense compensator 140 (e.g., by a spring load on a valve spool of the load sense compensator), the load sense compensator 140 maintains the pump control actuator 133 in fluid communication with the tank so that the swash plate 131 remains in the maximum displacement position. When the output pressure from the pump 130 reaches a pressure which yields a pressure margin that is equal to a pressure margin set by the load sense compensator 140, the load sense compensator 140 places the pump control actuator 133 in fluid communication with pump output pressure so that the swash plate 131 moves toward the minimum pump displacement position thereby destroking the pump 130 and reducing pump displacement to prevent the pump output pressure from exceeding a pressure margin set by the load sense compensator 140. Thus, the pressure margin set by the by the load sense compensator is maintained. In some implementations, the variable displacement pump 130 is electronically controlled rather than being hydraulically controlled.

In accordance with the present disclosure, the hydraulic system 100 additionally includes a supply pressure sensor 142 to detect the supply pressure, $P_S$, provided by the variable displacement hydraulic pump 130 and a meter-in load pressure sensor 144 to detect the meter-in load pressure, $P_A$, at the actuator 110 during extension of the actuator 110. A meter-in load pressure sensor 145 is also provided for detecting the meter-in load pressure at the actuator 120; a similar meter-in load pressure sensor would be provided for each of any additional actuators included in the load sense hydraulic system 100.

Knowing the pressure drop across the first metering valve 114 (illustrated in detail in FIG. 1B; a check valve 147 coupled intermediate the A and B ports of the actuator 110 is also illustrated) and knowing the pressure drop across the first compensating valve 116 then $P_A = P_S -$Pressure Drops in the flow line 112 during normal operation. Consider the example where there is a known pressure drop across the first metering valve 114 of 16 bar, a known pressure drop across the first compensating valve 116 of 1 bar, and a supply pressure of 167 bar, then the meter-in load pressure $P_A$ is 167−16−1=150 bar. As such, there is load sense margin, ΔP of 17 bar during normal operation of the actuator 110 during extension of the actuator 110.

Figure 2:
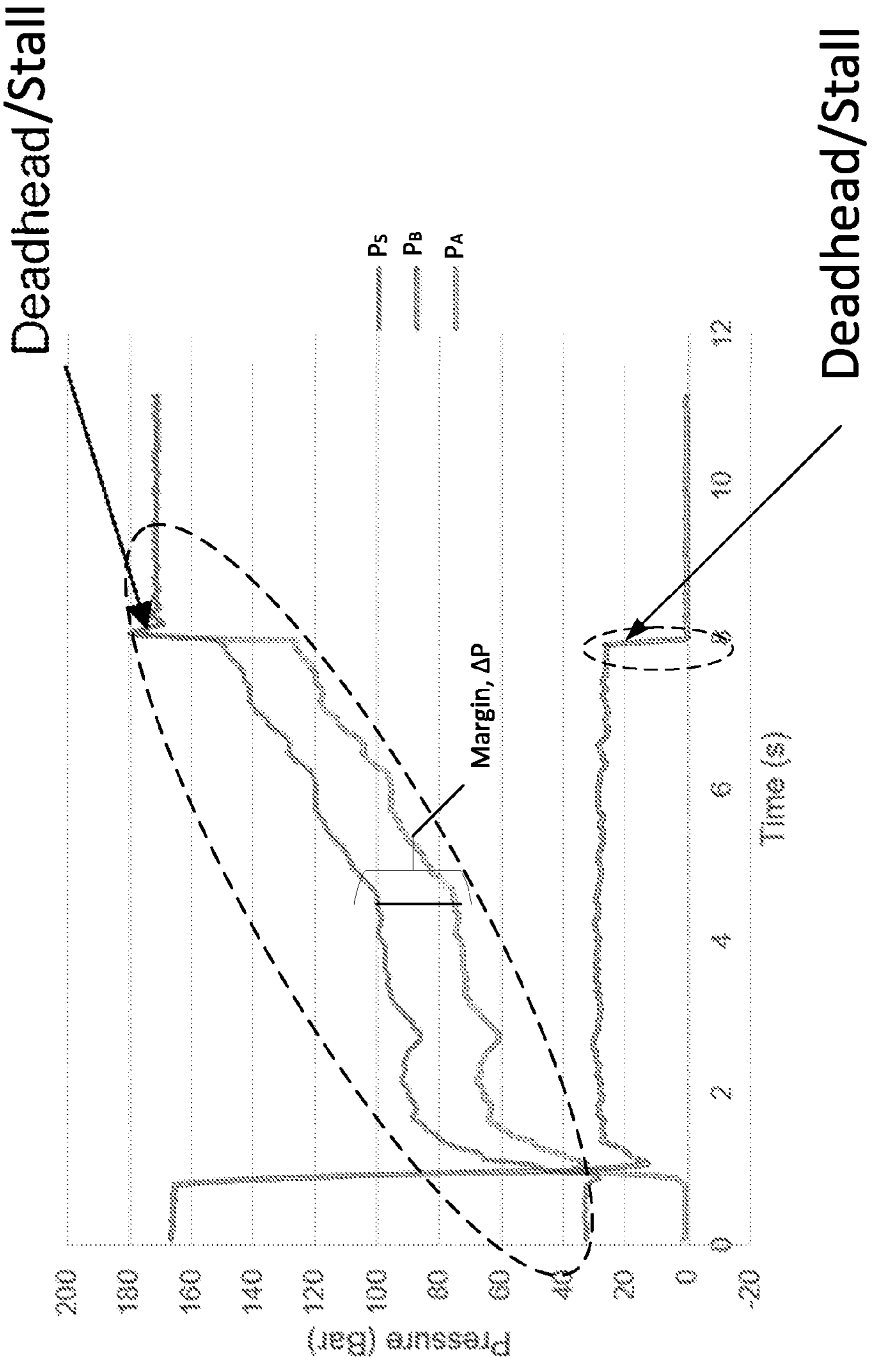
FIG. 2 is a time-pressure graph illustrating a load sense margin during operation of the load sense hydraulic system for FIGS. 1A-1B.

During normal operation, a controller 150 receives the inputs from the supply pressure sensor 142 and meter load-in pressure sensor 144 enabling monitoring of the load sense margin ΔP. The load sense margin ΔP is generally maintained during normal operation, as illustrated in FIG. 2, with meter-in pressure $P_A$ tracking the supply pressure $P_S$ by the load sense margin. However, when the meter-in pressure $P_A$ collapses (e.g., becomes substantially equal) to the supply pressure $P_S$ during operation, it is known that the actuator 110 is experiencing one of two conditions. The first condition is that of deadhead where the actuator is at or near full extension, thus causing the pressure $P_A$ to increase. The second condition is that of a stall where the actuator 110 is under a load that is preventing it from moving and thereby causing the pressure $P_A$ to increase. Based on past operation (or as set by programmed parameters), the controller 150 is aware of the load sense margin ΔP at which collapse is likely to occur. Thus, during continued operation, an actual load sense margin ΔP is monitored. When a decrease in the actual load sense margin ΔP by a predetermined threshold amount occurs, as compared to the pre-determined normal operating pressure margin, a deadhead or stall condition is deemed to exist. When the deadhead or stall condition exists, the controller 150 produces an output 152 representative of the condition. This output can be used by the controller 150 to adjust operational parameters within the load sense hydraulic system 100.

In the instance that actuators 110 and 120 are single-sided actuators, only a meter-in load pressure at the actuator 110, 120 is available for monitoring and tracking the load sense margin, e.g., a meter-out load pressure is not available. However, as shown in FIGS. 1A-1B, actuators 110, 120 are dual-sided actuators and a meter-out load pressure is available for monitoring the load sense margin during retraction of the actuator 110. In the example of FIGS. 1A-1B, the first metering valve 114 performs the metering for the meter-out load pressure (metering valve 124 performs the metering for the meter-out load pressure of actuator 120), however, it is possible that an additional metering valve, independent of the first metering valve, performs the metering function for the meter-out load pressure. A pressure sensor is 151 is provided intermediate the first metering valve 114 and the actuator 110 at the B port of the actuator to sense the meter-out load pressure $P_B$ (a pressure sensor 153 is similarly provided proximate actuator 120). Similar to $P_A$, $P_B$ is equal to the supply pressure $P_S$ minus the pressure drops in the flow line during a retraction operation of the actuator 110 and $P_B$ will follow the supply pressure $P_S$ with a margin and a margin collapse at deadhead/stall similar to that illustrated in FIG. 2 albeit with pressures decreasing rather than increasing. Once again, the controller 150 operates to determine when a decrease in the actual load sense margin by a predetermined threshold amount occurs, as compared to the pre-determined normal operating pressure margin, indicating a deadhead or stall condition. The controller 150 produces an output 152 representative of the condition. This output can be used by the controller 150 to adjust operational parameters within the load sense hydraulic system 100.

Figure 3:
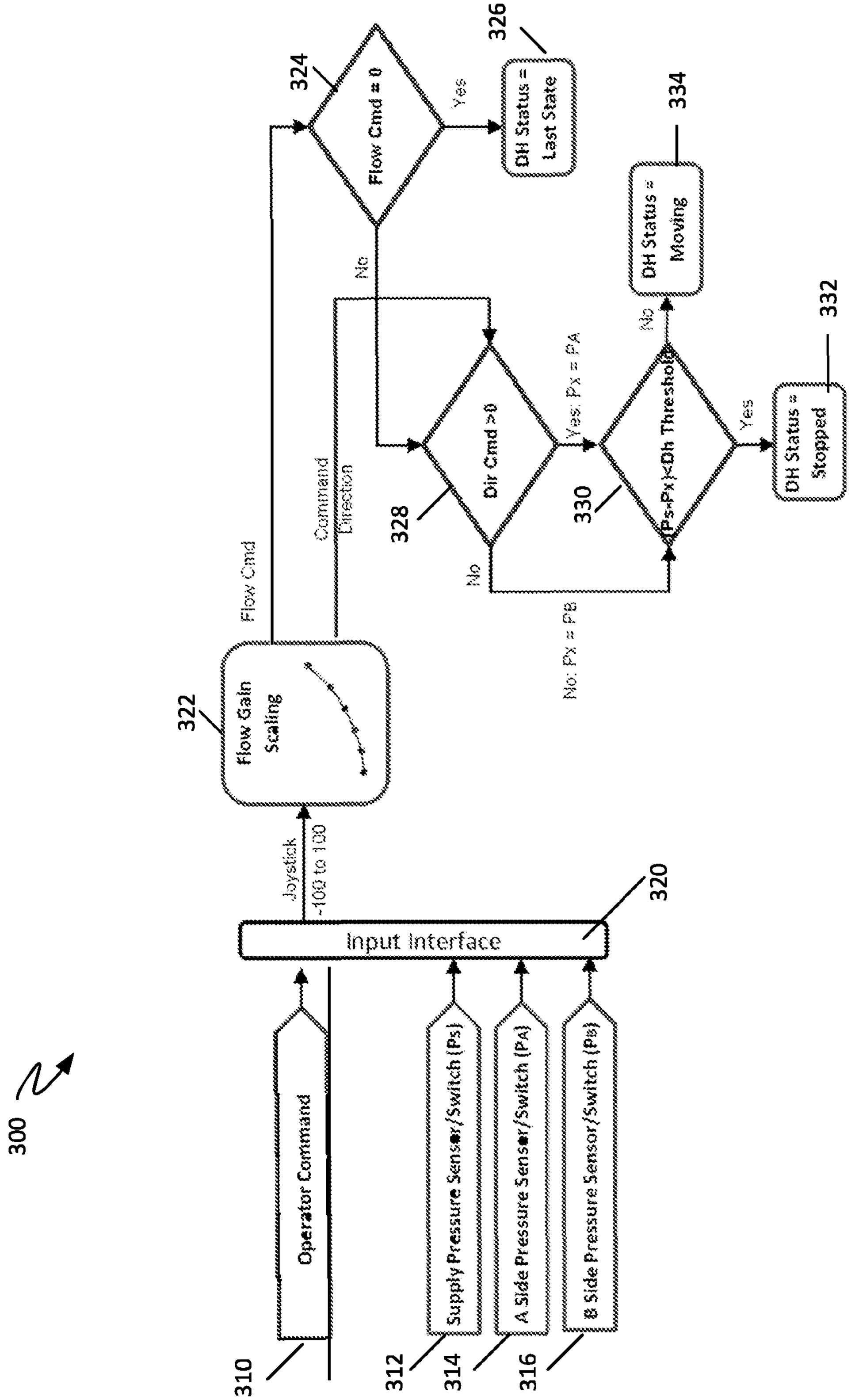
FIG. 3 is a flow chart illustrating an example method for deadhead/stall detection of a load sense hydraulic system.

Referring to FIG. 3, a flowchart illustrating an example method 300 based on margin monitoring for deadhead/stall detection of a load sense hydraulic system is provided. As shown, an operator command input 310 (e.g., a joystick input) is supplied to an input interface 320 of a controller (e.g., controller 150) as pressure sensor inputs, including supply pressure input 312, A-side meter-in load pressure input 314, and B-side meter-out load pressure input 316. Responsive to the operator command input 310, flow gain scaling is performed per operation block 322, and a flow command along with a direction command are generated and subjected to various decision blocks. In the instance that the flow command is equal to zero (e.g., no flow), 324:YES, a deadhead/stall status within the controller remain in its last state (deadhead or not deadhead), 326.

In the instance that the flow command is not equal to zero (e.g., flow is requested), 324:NO, it is determined whether the direction command is for extending an actuator, 328:YES or whether the direction command is for retracting an actuator, 328:NO. If the direction command is for extending the actuator, 328:YES, the load sense pressure margin between the A-side meter-in load pressure input 314 and the supply pressure $P_S$ is assessed against a deadhead/stall threshold margin to determine a deadhead/stall status of the actuator at decision block 330. If the load sense pressure margin between the A-side meter-in load pressure input 314 and the supply pressure $P_S$ is less than the deadhead/stall threshold margin, 330:YES, then the deadhead/stall status is deemed stopped (e.g., deadheaded or stalled) per operation block 332. Otherwise, the deadhead status is deemed moving per operation block 334. If the direction command is for retracting the actuator, 328:NO, the load sense pressure margin between the B-side meter-out load pressure input 316 and the supply pressure $P_S$ is assessed against a deadhead/stall threshold margin to determine a deadhead/stall status of the actuator at decision block 330. If the load sense pressure margin between the B-side meter-out load pressure input 314 and the supply pressure $P_S$ is less than the deadhead/stall threshold margin, 330:YES, then the deadhead/stall status is deemed stopped (e.g., deadheaded or stalled) per operation block 332.

In certain embodiments, the meter-out load pressure $P_B$ from the actuator 110 is monitored without concern of a pressure margin and/or the meter-in load pressure $P_A$ to the actuator 110 is monitored without concern of a pressure margin. Rather, the meter-out load pressure (or meter-in load pressure) is monitored by the controller 150 for the start of a drop to zero pressure (see FIG. 2), e.g., when the pressure $P_B$ (or pressure $P_A$) drops below a pre-determined pressure threshold. Note the drop to zero pressure corresponds in timing with the collapse of the pressure margin between the supply pressure $P_S$ and the meter-in load pressure $P_A$ (or the pressure margin between the supply pressure $P_S$ and the meter-out load pressure $P_B$). As such, the start of the drop to zero pressure indicates a deadhead or stall condition. Monitoring of the meter-out load pressure $P_B$ in this manner can be used as an alternative to the margin monitoring approach described herein, or can be used in addition to the margin monitoring approach as a cross-check for better certainty in determining that a deadhead/stall condition has occurred. As with the margin monitoring approach, the controller 150 can provide an indication of the deadhead/stall condition and can produce the output 152 for adjustment of operational parameters within the load sense hydraulic system 100.

Figure 4:
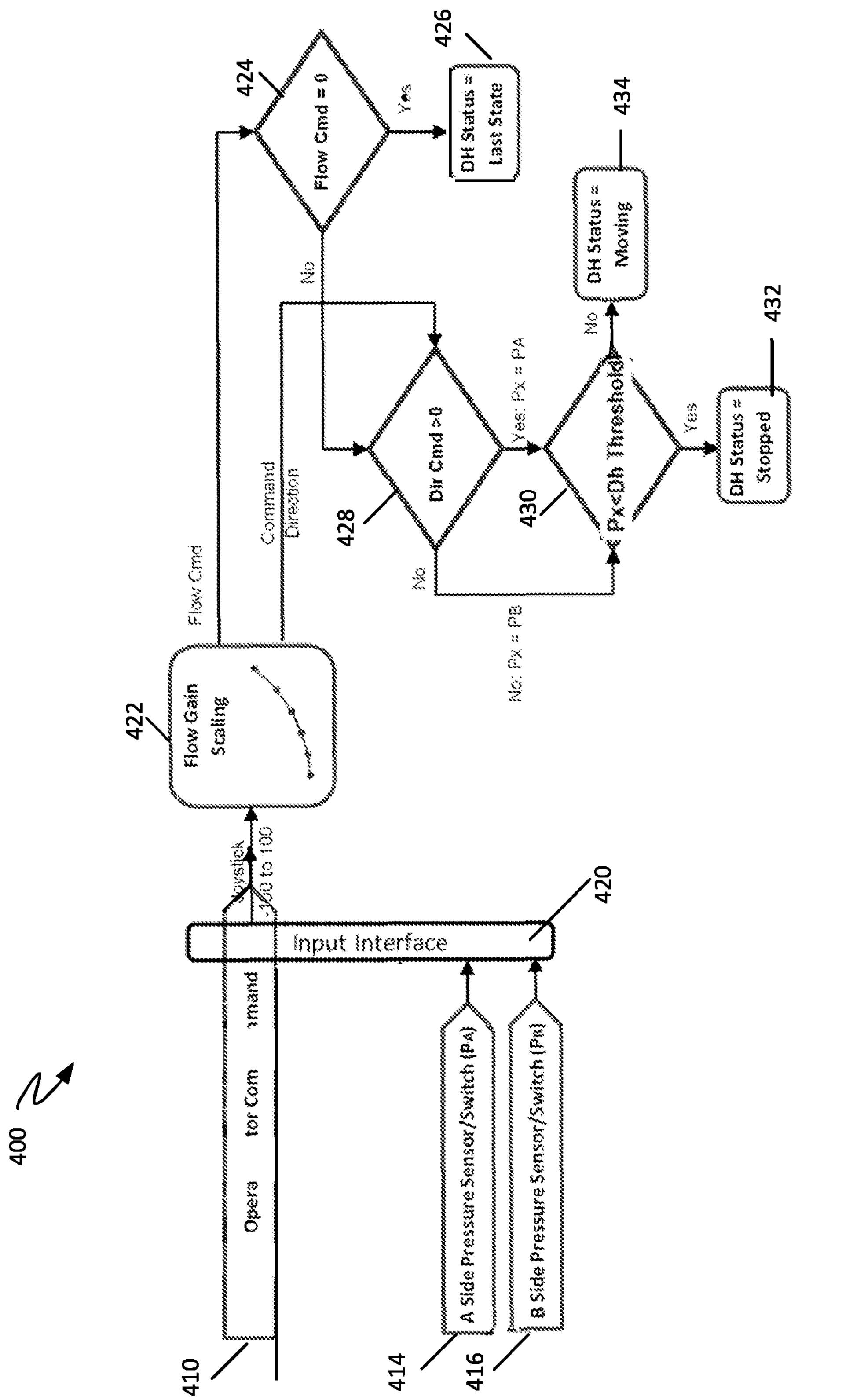
FIG. 4 is a flow chart illustrating an example method for deadhead/stall detection of a load sense hydraulic system.

Referring to FIG. 4, a flowchart illustrating an example method 400 based on a drop to zero pressure monitoring for deadhead/stall detection of a load sense hydraulic system is provided. As shown, an operator command input 410 (e.g., a joystick input) is supplied to an input interface 420 of a controller (e.g., controller 150) as pressure sensor inputs the A-side meter-in load pressure input 414 and the B-side meter-out load pressure input 416. Responsive to the operator command input 410, flow gain scaling is performed per operation block 422, and a flow command along with a direction command are generated and subjected to various decision blocks. In the instance that the flow command is equal to zero (e.g., no flow), 424:YES, a deadhead/stall status within the controller remain in its last state (deadhead or not deadhead), 426.

In the instance that the flow command is not equal to zero (e.g., flow is requested), 424:NO, it is determined whether the direction command is for extending an actuator, 428: YES or whether the direction command is for retracting an actuator, 428:NO. If the direction command is for extending the actuator, 428:YES, the A-side meter-in load pressure input 414 is assessed against a deadhead/stall pressure threshold to determine a deadhead/stall status of the actuator at decision block 430. If the A-side meter-in load pressure input 414 is less than the deadhead/stall pressure threshold, 430:YES, then the deadhead/stall status is deemed stopped (e.g., deadheaded or stalled) per operation block 432. Otherwise, the deadhead status is deemed moving per operation block 434. If the direction command is for retracting the actuator, 428:NO, B-side meter-out load pressure input 416 is assessed against a deadhead/stall pressure threshold to determine a deadhead/stall status of the actuator at decision block 430. If the B-side meter-out load pressure input 414 and is less than the deadhead/stall pressure threshold, 430: YES, then the deadhead/stall status is deemed stopped (e.g., deadheaded or stalled) per operation block 432.

In certain embodiments (e.g., the use of the load sense hydraulic system 100 with a plurality of actuators to move different sections of a boom lift), orientation data associated with an actuator can be used in combination with the load sense margin to improve operating efficiencies of the load sense hydraulic system 100. In certain embodiments, the orientation data associated with one or more actuators is supplied to the controller 150 by an inertial measurement unit (IMU), e.g., IMU input 154 (see FIGS. 1A-1B). An IMU is an electronic device that measures and reports an actuator's acceleration, angular rate and orientation using a combination of accelerometers, gyroscopes and/or magnetometers. The orientation data received at the controller 150 from the IMU enables the controller 150 to determine if an actuator is close to an end stop when a load sense margin collapse is detected by the controller 150 thereby enabling adjustment of hydraulic system operational parameters. For some types of equipment, operators desire to move the actuators to the end of the stroke, such as to shake material out of an excavating bucket end. For this reason, it is not desirable to use the orientation data alone to limit the motion of the actuator as stopping motion slightly before striking the end stop would negatively affect performance.

Figure 5:
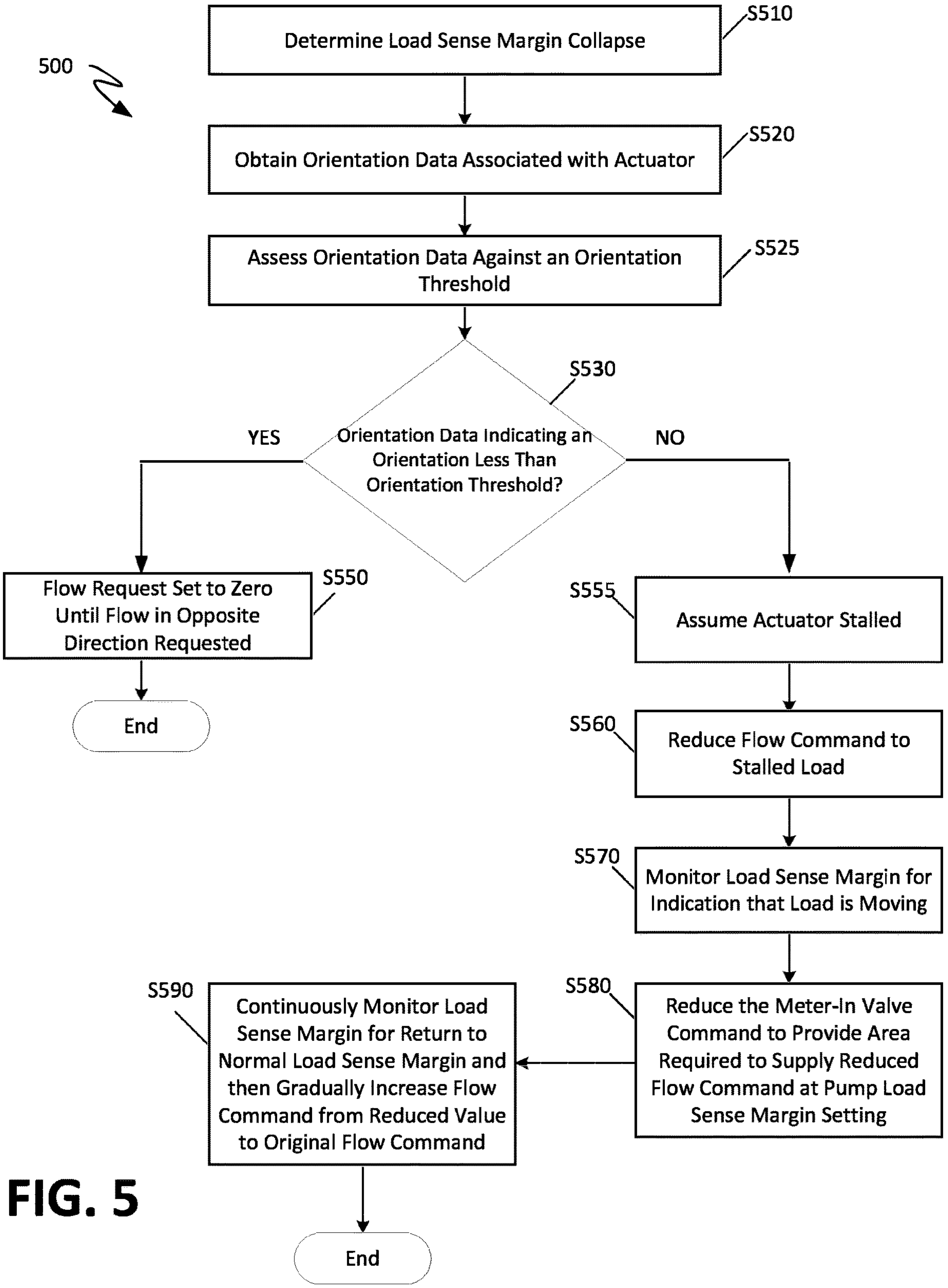
FIG. 5 is a flow chart illustrating an example method for deadhead/stall detection of a load sense hydraulic system.

A method for operating the load sense hydraulic system utilizing IMU input is illustrated in FIG. 5. As shown, the method begins with the controller 150 determining that the load sense margin of an actuator (e.g., actuator 110) has collapsed, S510 and obtaining orientation data associated with the actuator, S520. Subsequently, the orientation data is assessed against a predetermined orientation threshold with the orientation threshold indicating that the actuator is at (or very near) the end stop of the actuator, S525, for example indicating that the actuator is at a minimum distance from the end stop.

If the assessment indicates that the orientation data associated with the actuator is less than the orientation threshold, indicating the actuator is either at its end stop or close enough that it will not affect machine productivity by stopping at this point, S530:YES, then (presuming flow to the actuator is still being requested to the actuator), the flow request is set to zero until flow is requested in the opposite direction, S550. This results in the meter in valve area being set to zero, which causes the pump pressure to drop to that of the next highest-pressure load. Further, if the total system flow requested is greater than the pump is able to supply, the flow from the actuator, which is at its end stop, can be reallocated to other loads. This results in both increased efficiency from the lower pump pressure and increased productivity from the reallocation of otherwise unutilized flow.

If the assessment indicates that the orientation data associated with the actuator is greater than the orientation threshold, S530:NO, it is assumed that the actuator is stalled because it has encountered a load requiring a greater pressure than the load sense hydraulic system can provide, S555. If flow to the load were to be totally cut off at this point, machine productivity would be reduced by not allowing full utilization of the actuator. As such, the method 500 continues to step S560 where the flow command to the stalled load is reduced to a minimal amount appropriate for the actuator size and meter-in valve resolution and the load sense margin is monitored, S570. Monitoring the load sense margin of the reduced flow provides an indication for when the actuator begins to move again.

Once the load sense margin of the reduced flow indicates the actuator has begun to move, the controller 150 reduces the meter-in valve command to the given area required to supply the reduced flow command at the pump's load sense margin setting, S580. The difference between the original flow command and reduced flow command can be reallocated to other actuators in the system if the other actuators were limited by pump supply, thereby resulting in increased productivity. Subsequently, the load sense margin for the stalled load is continuously monitored and when the margin returns to normal the flow command is gradually increased from its reduced value back to the level of the flow command from the operator, S590.

Figure 6:
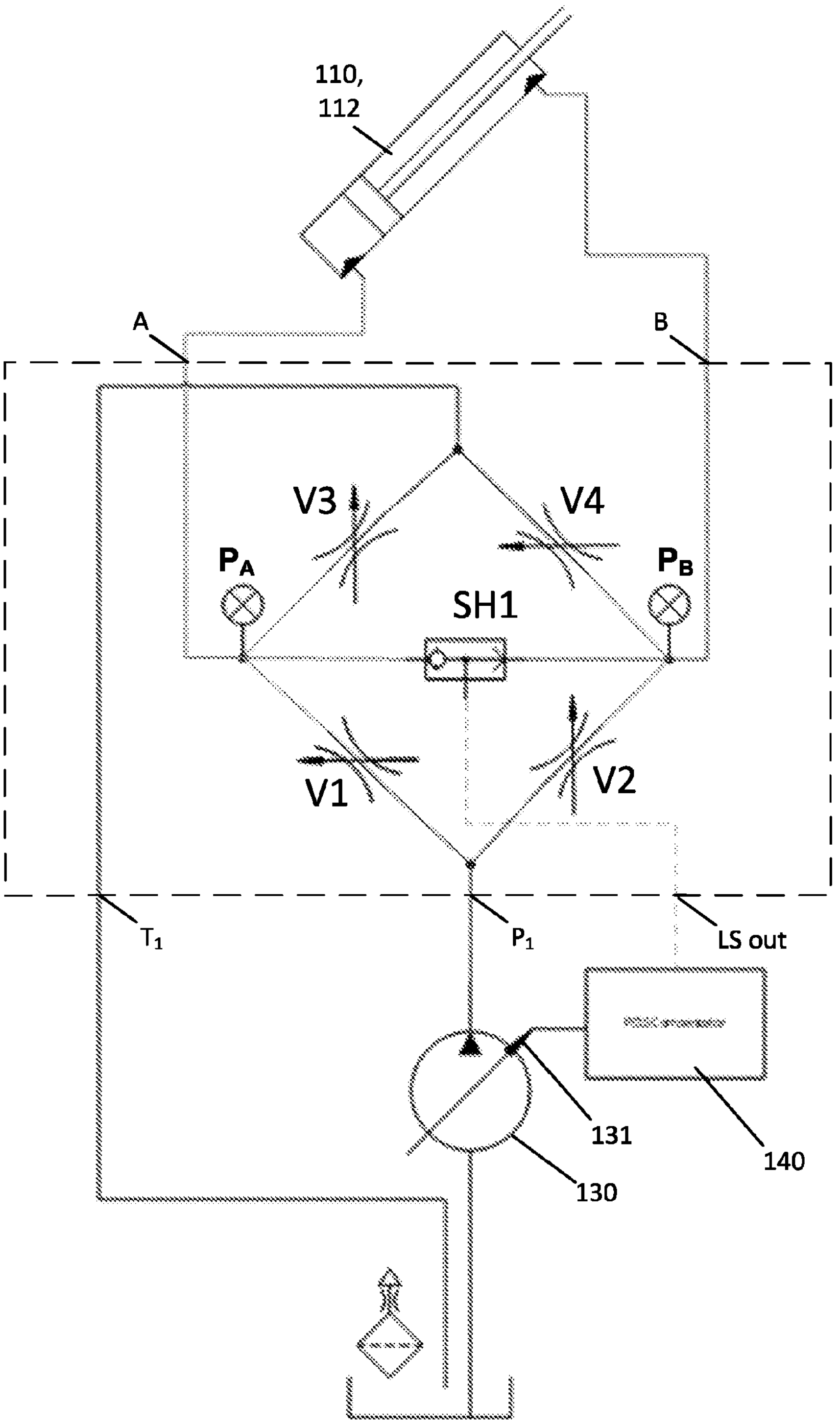
FIG. 6 is a schematic of an example load sense hydraulic system.
Figure 7:
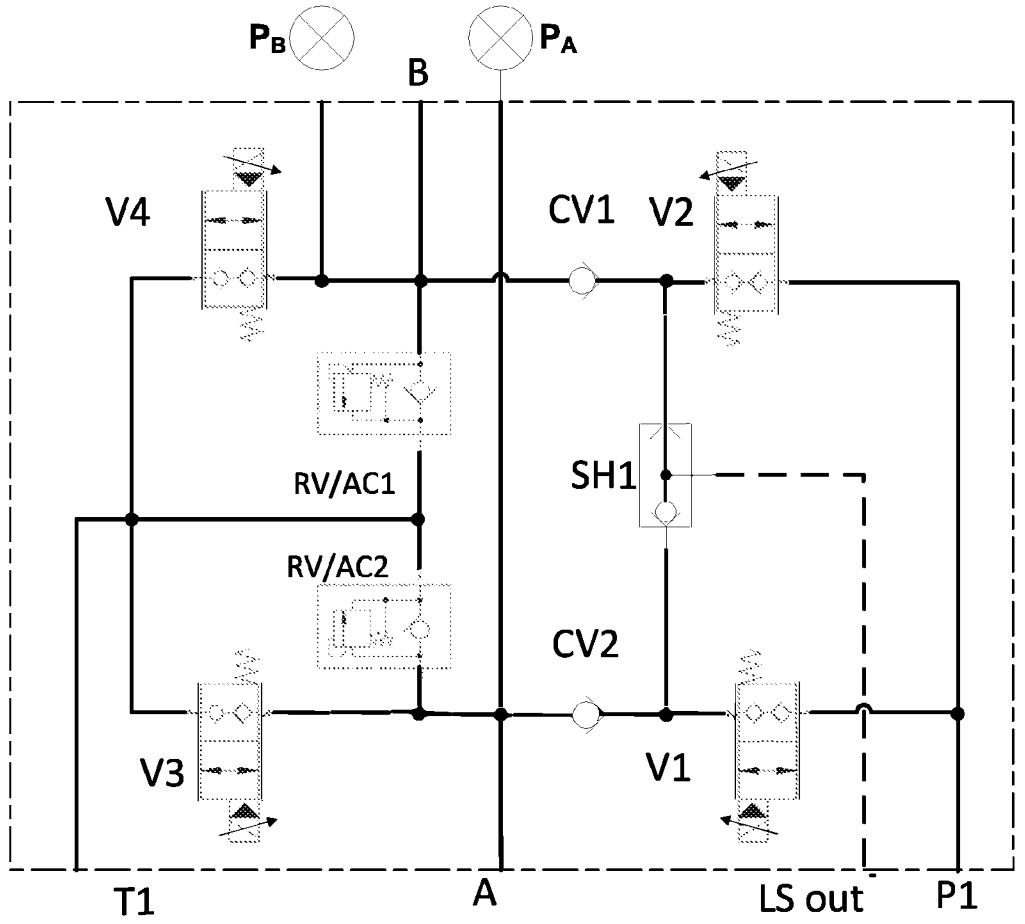
FIG. 7 is a schematic of an example load sense hydraulic system.

In certain embodiments, the method of FIG. 5 is implemented with both the functions of metering and pressure compensation being performed by a single electronically controlled metering element rather than separate valves, for example the independent metering valve circuit generically presented at FIG. 6 with a Wheatstone bridge type arrangement including valves V1-V4 and shuttle valve SH1, or the more specifically arranged metering circuit presented at FIG. 7, including valves V1-V4, SH1, RV/AC1, RV/AC2, CV1, and CV2. In operation with either depicted circuit, valve V1 (or V2) provides the function of the first meter-in valve 114 and the function of the first pressure compensation valve 116 while valve V3 (or V4) performs the meter-out function performed by valve 114.

This disclosure describes some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure is thorough and complete and fully conveys the scope of the possible aspects to those skilled in the art.

As should be appreciated, the various aspects described with respect to the figures herein are not intended to limit the technology to only those aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic system comprising:

a hydraulic actuator having first and second ports, wherein, in operation, one of the first and second ports has a meter-in load pressure and the other of the first and second ports has a meter-out pressure;

at least one metering valve for metering flow in and out of the hydraulic actuator;

a variable displacement hydraulic pump;

at least one pressure sensor;

a load sense system including a load sense valve that provides a load pressure of the hydraulic actuator to the variable displacement hydraulic pump, the variable displacement hydraulic pump operating to maintain a normal operating pressure margin above the actuator load pressure enabling flow to the hydraulic actuator responsive to a command for flow to the hydraulic actuator; and an electronic controller for monitoring hydraulic pressure in the hydraulic system via the at least one pressure sensor, the electronic controller being configured to generate a deadhead or stall indication with respect to the hydraulic actuator when flow is being commanded to the hydraulic actuator and at least one of the following conditions is detected: a) the meter-out pressure decreases below a predetermined meter-out pressure threshold; or b) an actual pressure margin above the meter-in load pressure decreases by a predetermined amount as compared to the normal operating pressure margin;

wherein the at least one pressure sensor includes a first pressure sensor for sensing pressure at the first port, a second pressure sensor for sensing pressure at the second port, and a third pressure sensor for sensing pump outlet pressure.

2. The hydraulic system of claim 1, wherein the electronic controller is configured to generate a deadhead or stall indication with respect to the hydraulic actuator when flow is being commanded to the hydraulic actuator and the meter-out pressure decreases below a predetermined meter-out pressure threshold.

3. The hydraulic system of claim 1, wherein the electronic controller is configured to generate a deadhead or stall indication with respect to the hydraulic actuator when flow is being commanded to the hydraulic actuator and the actual pressure margin above the meter-in load pressure decreases by a predetermined amount as compared to the normal operating pressure margin.

4. The hydraulic system of claim 1, wherein the electronic controller is configured to detect both the conditions to determine whether a deadhead or stall has occurred.

5. The hydraulic system of claim 1, further comprising a load sense pressure sensor for sensing load sense pressure.

6. The hydraulic system of claim 1, further comprising a pump pressure compensator for limiting a maximum pressure that can be output by the hydraulic pump, and a load sense relief valve for limiting a maximum load sense pressure that can be achieved.

7. A load sense hydraulic system comprising:

first and second hydraulic actuators;

first and second flow lines respectively corresponding to the first and second actuators;

a first metering valve for metering flow to the first actuator through the first flow line;

a first pressure compensating valve positioned along the first flow line between the first metering valve and the first actuator;

a second metering valve for metering flow to the second actuator through the second flow line;

a second pressure compensating valve positioned along the second flow line between the second metering valve and the second actuator;

a variable displacement hydraulic pump;

a load sense system for controlling the displacement of the variable displacement hydraulic pump based on a highest load pressure of first and second load pressures respectively present in the first and second flow lines adjacent the first and second actuators;

a first pressure sensor and a second pressure sensor; and an electronic controller for monitoring, via the first pressure sensor and the second pressure sensor, an actual pressure margin across the metering valve and the pressure compensating valve corresponding to the flow line having the highest load pressure and for generating a deadhead or stall indication when the actual pressure margin decreases by a predetermined amount as compared to a pre-determined normal operating pressure margin;

wherein the first pressure sensor is positioned intermediate the variable displacement hydraulic pump and the first metering valve in the first flow line, and wherein the second pressure sensor is positioned intermediate the first pressure compensating valve and the first actuator in the first flow line.

8. The load sense hydraulic system of claim 7, further comprising a pressure compensator that limits maximum operating pressure of the load sense hydraulic system.

9. The load sense hydraulic system of claim 8, wherein the pressure sensor comprises a first pressure sensor and a second pressure sensor.

10. The load sense hydraulic system of claim 8, further comprising first and second inertial measurement units (IMUs) associated respectively with the first and second actuators, the first and second IMUs having been used to establish a stall orientation threshold for at least one of the actuators at the electronic controller.

11. The load sense hydraulic system of claim 7, further comprising first and second inertial measurement units (IMUs) associated respectively with the first and second actuators, the first and second IMUs having been used to establish a stall orientation threshold for at least one of the actuators at the electronic controller.

12. The load sense hydraulic system of claim 11, wherein the stall orientation threshold is associated with a minimum distance of the at least one actuator from a mechanical end stop of the at least one actuator.

13. The load sense hydraulic system of claim 7, wherein the load sense system is a fully hydraulic load sense system including a load sense valve for controlling an output pressure of the variable displacement hydraulic pump based on the highest load pressure to maintain a normal operating pressure margin across the metering valve and the pressure compensating valve corresponding to the flow line having the highest load pressure, the load sense system providing pilot pressure to the first and second pressure compensating valves and to the load sense valve, the load sense system including a pressure relief valve.

14. A method of operating a load sense hydraulic system having:

a hydraulic actuator having first and second ports, wherein, in operation, one of the first and second ports has a meter-in load pressure and the other of the first and second ports has a meter-out pressure;

at least one metering valve for metering flow in and out of the hydraulic actuator;

a variable displacement hydraulic pump;

at least one pressure sensor;

a load sense system including a load sense valve that provides a load sense pressure of the hydraulic actuator to the variable displacement hydraulic pump, the variable displacement hydraulic pump operating to maintain a normal operating pressure margin above the actuator load sense pressure enabling flow to the hydraulic actuator responsive to a command for flow to the hydraulic actuator; and an electronic controller for monitoring hydraulic pressure in the hydraulic system via the at least one pressure sensor, the electronic controller being configured to generate a deadhead or stall indication with respect to the hydraulic actuator when flow is being commanded to the hydraulic actuator and at least one of the following conditions is detected: a) the meter-out pressure decreases below a predetermined meter-out pressure threshold; or b) an actual pressure margin above the meter-in load pressure decreases by a predetermined amount as compared to the normal operating pressure margin, the method comprising:

determining, based on orientation data being received from a first inertial measurement units (IMU), that an orientation threshold has been exceeded and that the hydraulic actuator is stalled;

responsive to determining that the hydraulic actuator is stalled, reducing a flow command to the stalled actuator and monitoring the actual pressure margin for an indication that the hydraulic actuator is moving;

receiving the indication that the hydraulic actuator is moving and, responsively, reducing a meter-in valve command to provide a valve area needed to supply the reduced flow command at a load sense margin setting of the variable displacement hydraulic pump; and continuously monitoring the actual load sense margin for a return to normal operation load sense margin and, responsive to the return to the normal load sense margin, increasing the flow command from the reduced value to an original flow command.

15. The method of claim 14, further comprising:

determining, based on orientation data being received from the first IMU, that the orientation threshold has not been exceed and that the hydraulic actuator is near an end stop; and responsive to the orientation threshold not being exceeded, setting a flow request for the hydraulic actuator to zero until flow opposite a first flow line is requested.

* * * * *